United States Patent [19]

Kanis

[11] Patent Number: 4,589,587

[45] Date of Patent: May 20, 1986

[54] PROCESS FOR PRODUCING A TANK, PARTICULARLY FOR TRANSFORMERS

[75] Inventor: Walter Kanis, Unterlauchringen, Fed. Rep. of Germany

[73] Assignee: Zschokke Wartmann AG, Brugg, Switzerland

[21] Appl. No.: 567,401

[22] PCT Filed: Apr. 21, 1983

[86] PCT No.: PCT/CH83/00048

§ 371 Date: Dec. 20, 1983

§ 102(e) Date: Dec. 20, 1983

[87] PCT Pub. No.: WO83/03921

PCT Pub. Date: Nov. 10, 1983

[30] Foreign Application Priority Data

Apr. 30, 1982 [CH] Switzerland ........................ 2665/82

[51] Int. Cl.[4] .............................................. B23K 31/02

[52] U.S. Cl. ................................ 228/183; 228/173.6; 228/138

[58] Field of Search .................... 228/173 C, 183, 138, 228/139

[56] References Cited

U.S. PATENT DOCUMENTS

| | | | |
|---|---|---|---|
| 1,515,692 | 11/1924 | Mattice | 228/138 |
| 1,743,109 | 1/1930 | Borgman . | |
| 3,168,778 | 2/1965 | Ridder . | |
| 4,298,771 | 11/1981 | Olashaw | 228/138 |
| 4,469,269 | 9/1984 | Ito et al. | 228/173 C |

FOREIGN PATENT DOCUMENTS

| | | |
|---|---|---|
| 671286 | 2/1939 | Fed. Rep. of Germany . |
| 1763766 | 1/1972 | Fed. Rep. of Germany . |
| 2413617 | 9/1975 | Fed. Rep. of Germany . |
| 55-93205 | 7/1980 | Japan . |
| 55-132013 | 10/1980 | Japan . |
| 56-56610 | 7/1981 | Japan . |
| 56-56611 | 7/1981 | Japan . |

*Primary Examiner*—Nicholas P. Godici
*Assistant Examiner*—Kurt Rowan
*Attorney, Agent, or Firm*—Roylance, Abrams, Berdo & Goodman

[57] ABSTRACT

Firstly, individual wall parts are welded together from a cooling rib element (1), a tub side wall (2) and a frame part (3), the cooling rib element (1) being reinforced by strips (8, 9) and bars (10, 11). The individual wall parts are mounted on an assembly plate (16) by means of positioning bolts (17) and are held together by stirrups (18). By means of spot welds on the sloping, upwardly bent edges (6, 7) of cooling rib elements (1), the wall parts form a dimensionally stable casing, on which the various vertical and horizontal welds can be made. Due to the fact that the dimensionally stable wall parts are used for producing the transformer tank, the proportion of manual labor in the production of this tank can be considerably reduced, because welding takes place at clearly defined, easily accessible points.

2 Claims, 6 Drawing Figures

PROCESS FOR PRODUCING A TANK, PARTICULARLY FOR TRANSFORMERS

Figure 1:
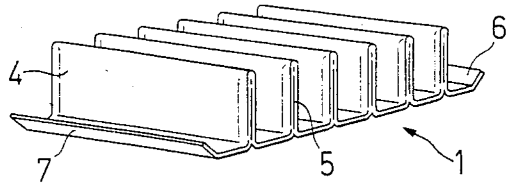

The invention relates to a process for producing a tank, particularly for transformers, which has a parallelepipedic or prismatic shape with casing walls formed from cooling rib elements and a bottom tub, and to a tank produced by this process.

It is known to use oil as a coolant for cooling electrical machines, particularly power transformers. Thus, a tank is provided around the electrical machine and its casing has at least four walls with cooling rib elements and a bottom tub. The upper end is defined by a frame to which is fixed, e.g. screwed a cover for completing the tank. The tank receives the electrical machine and an oil filling and the latter, in the simplest constructional embodiment of the tank, conducts the heat produced by the electrical machine to the outer wall of the tank, where it is convectively transferred to the outer air. In the manufacture of such a tank, the casing walls provided with the ribs and the bottom tub are welded together manually or with the aid of simple equipment. This process makes handling, particularly of the cooling rib elements forming the casing walls much more difficult, as a result of their lack of rigidity. The spread in the dimensions resulting from the lack of rigidity means that more rational manufacture, e.g. by mechanizing the welding of the joins cannot be achieved at an acceptable cost. In another known manufacturing process (German Pat. No. 2,413,617), several side walls are formed from a one-piece, corrugated sheet metal blank forming surface tension, which is chamfered in accordance with the number of faces. This admittedly makes it possible to reduce the welding costs. However, the difficulties due to the high flexibility of the corrugated wall, which more particularly occur in complicated matching and adaptation work when assembling the side walls with the bottom tub are not removed by this process.

The problem of the present invention is therefore to so develop a process of the aforementioned type, that it is not only possible to weld together the individual parts, e.g. the cooling rib elements to the bottom tub, but also to weld together the complete tank in a much simpler manner, so that mechanized or automated welding of the Joints can be achieved with relatively low expenditure. The process according to the invention also makes it possible to improve the quality of the welds.

According to the invention, this problem is solved in that the tank is assembled from individual wall parts, which also have been individually manufactured beforehand. At least one casing wall and one tub side wall are joined together to form a wall part, then, the latter, joined with the other wall parts, are combined to give a tank casng. Appropriately, the individual wall parts are formed from a casing wall, a tub side wall and a frame part, it being possible to reinforce the connection points between the individual parts.

The tank produced by the process according to the invention is characterized in that the wall parts have a flange shaped onto the free end of the tub side wall and frame part.

The invention is described hereinafter relative to an embodiment and the attached drawings, wherein show:

FIG. 1 a cooling rib element formed from a folded over steel plate in a three-dimensional view.

Figure 2:
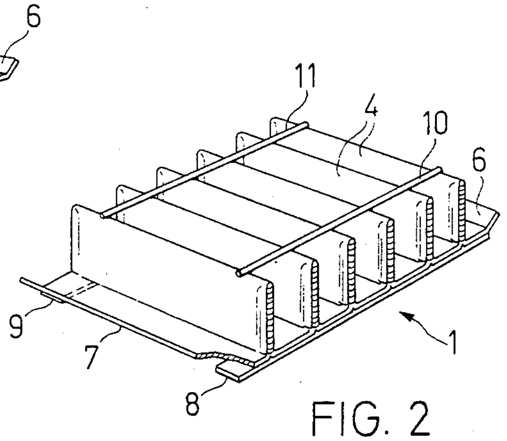

FIG. 2 the cooling rib element according to FIG. 1 with the fitted reinforcements.

Figure 3:
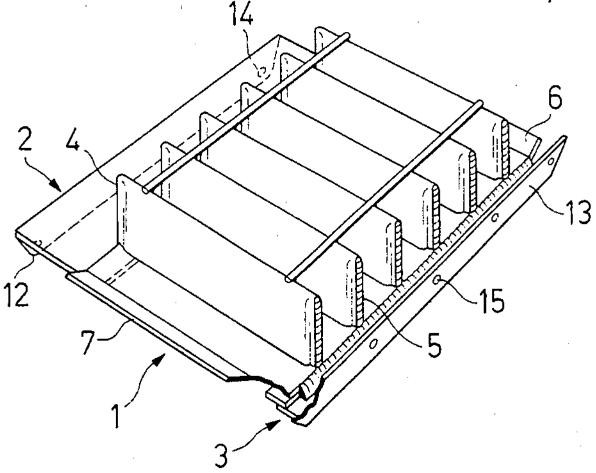

FIG. 3 a wall part assembled from a cooling rib element according to FIG. 2, a tub side wall and a frame part, in a three-dimensional view.

Figure 4:
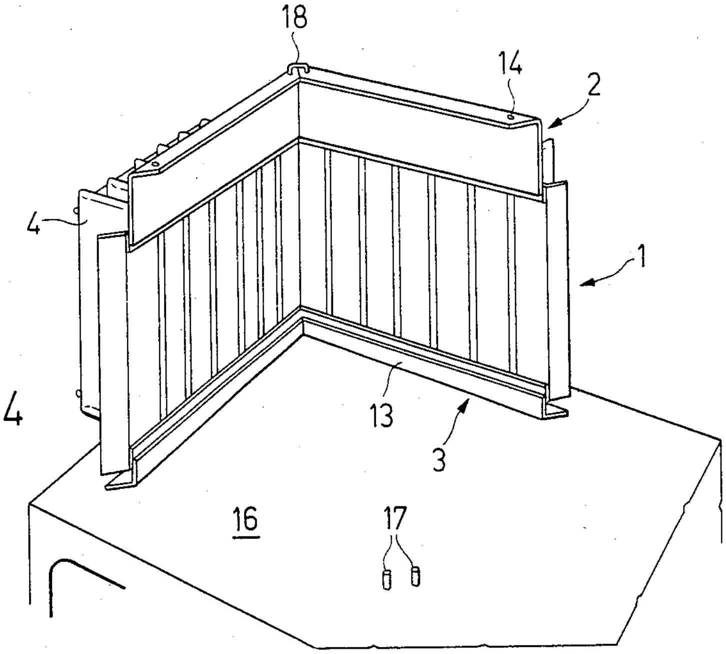

FIG. 4 the assembly of two wall parts and their positioning on an assembly surface.

Figure 5:
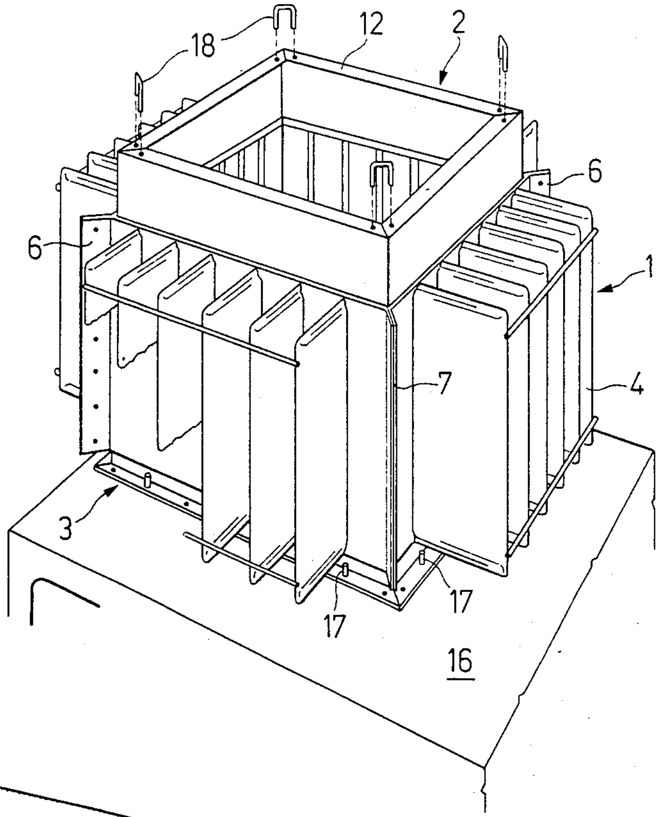

FIG. 5 the construction and positioning of four wall parts on an assembly surface in a three-dimensional view.

Figure 6:
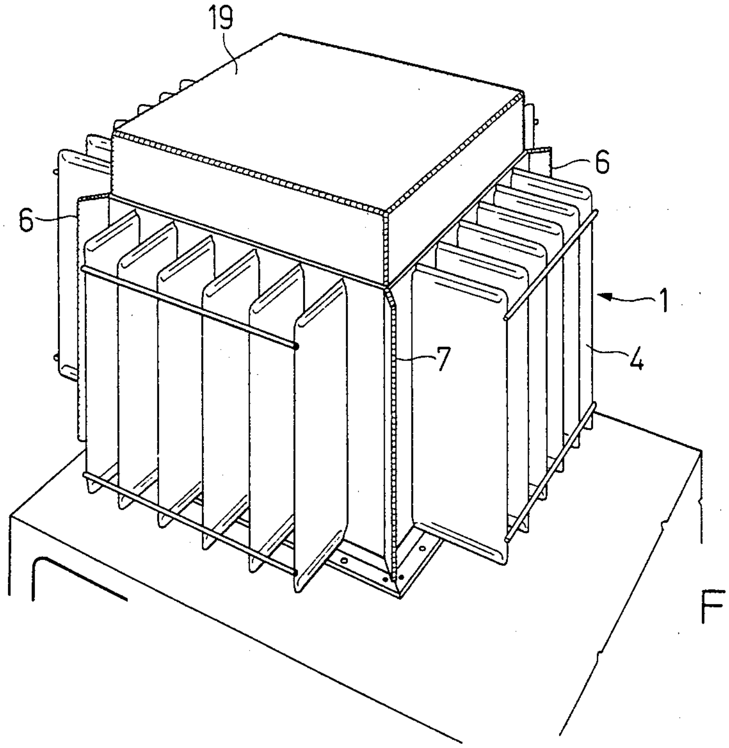

FIG. 6 the welded together wall parts according to FIG. 5 with the welded-on tub bottom.

FIGS. 1 to 3 show the manufacture of a wall part, as is used e.g. in the manufacture of a transformer tank. Firstly, a cooling rib element 1 is manufactured. For this purpose, a sheet steel strip having the width of the cooling rib element 1 is unwound from a strip reel and is provided in a folding or bending press with hollow cooling ribs 4, whose end 5 is squeezed together. The formed rib element comprises a base member or sheet having a lateral surface from which the ribs extend and having end edges parallel to the ribs. Sloping flanges 6 and 7 are bent to extend, at angles of preferably 45° to the plane of the base member, from the base member end edges (FIG.1).

The thus produced cooling rib element 1 is reinforced at the lateral edges by welding a flat strip 8, 9, cf FIG. 2, the ends of the cooling ribs 4 being reinforced by two round bars 10, 11. If the cooling ribs 4 have a considerable length, it is possible to weld on further round bars.

FIG. 3 shows a complete wall part, which comprises the cooling rib element 1, a side wall 2 and a frame part 3. Side wall 2 and frame part 3, Cf FIG. 3, are welded to the cooling rib element 1 at the side walls thereof, after firstly welding ends 5 of cooling ribs 4. A flange 12 or 13 is shaped onto the free end of side wall 2 and frame part 3 and is provided with bores 14, 15.

FIG. 4 shows the preparation of wall parts 1, 2, 3 for the welding together to form a transformer tank. Wall parts 1, 2, 3 are supported and positioned on an assembly plate 16, with frame part 3 towards the bottom. Positioning takes place by means of positioning bolts 17 arranged in assembly plate 16 and flange 13 of frame part 3 is mounted thereon with the aid of certain of the bores 15. Bores 14 of side wall 2 are used for mounting a stirrup and consequently hold together two wall parts. As the cooling rib element 1 is made stable by reinforcements 8 to 11, this also applies to all the wall parts 1, 2, 3, so that they can easily be positioned.

It is apparent from FIG. 5 that four wall parts can be combined to form a tank casing, each wall part being positioned by the positioning bolts 17 and held together by stirrups 18. FIG. 5 shows that the upwardly bent starting and finishing edges 6, 7 are used to facilitate the positioning of the wall parts and permit a good welding joint possibility between the cooling rib elements 1. Unavoidable manufacturing tolerances can be easily compensated by the sloping starting and finishing edges 6, 7. Edges 6, 7 are superimposed, so that there is a precisely defined welding position on their circumference and this helps to ensure a completely satisfactory weld.

When the wall parts have been positioned and held together, the edges 6, 7 are joined by spot welding, the welding spots appropriately being inwardly displaced on the roofs of edges 6, 7, in order to avoid bending stresses in the circumferential weld of edges 6, 7, or at least to keep these stresses small, in the case that an internal pressure occurs.

As a result of the spot welding at edges 6, 7, the casing is fixed in its final shape and can be removed from assembly plate 16 for carrying out the final welding of the different welds.

FIG. 6 shows the finally welded transformer tank which, in addition to the casing according to FIG. 5, has a bottom 19 welded onto the flanges 12 of side wall 2.

The welding of welds between wall parts 1, 2, 3 and on bottom 19 can be carried out manually or mechanically. It is unimportant for the present invention, in what way the transformer tank is welded together. What is important is that initially wall parts are obtained in a stable, non-deformable form and during their manufacture from the individual parts 1 to 3, the dimensional stability is achieved by simultaneously obtaining easily weldable and clearly defined welding positions. This is particularly the case in connection with flat strips 8, 9 (FIG. 2), which ensure a clearly defined welding position, which helps to make it possible to produce a completely satisfactory weld. There is in particular an improvement to the weld at the bases of rib ends 5.

The presently described process is not limited to the manufacture of transformer tanks and can also be used in other fields, where liquid must be cooled by casing walls provided with ribs.

I claim:

1. A process for producing a tank, comprising the steps of:

prefabricating a plurality of wall parts, each of the wall parts including a rib element having a base member with a plurality of elongated ribs extending outwardly from a first lateral surface thereof and a generally smooth second lateral surface opposite to the first lateral surface, the base member having end edges generally parallel to the ribs and lateral edges generally perpendicular to the ribs, reinforcement bars fixed to free ends of the ribs, flat strips fixed to the second lateral side along the lateral edges with each of the flat strips having a side edge flush with one of the lateral edges, a side wall directly welded to and carried by one of the flat strips, a frame part directly welded to and carried by the other flat strip, the side wall and the frame part having flanges extending generally perpendicular to the second lateral surface, the flanges having positioning bores;

supporting the wall parts on an assembly plate with the frame part flange contacting the assembly plate and with the positioning holes in the frame part flange receiving bolts fixedly secured and extending upwardly from the assembly plate to relatively position the wall parts;

placing stirrups in the side wall flange holes of adjacent wall parts to hold adjacent wall parts together; and welding the wall parts together.

2. A process according to claim 1 wherein sloping flanges extending at generally 45° angles from the base member end edges are welded together along free edges of the sloping flanges.

* * * * *